(12) United States Patent
Cooley (10) Patent No.: US 8,458,268 B1
(45) Date of Patent: Jun. 4, 2013

(54) SYSTEMS AND METHODS FOR DISTRIBUTING SPAM SIGNATURES

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 500 days.

(21) Appl. No.: 12/710,056

(22) Filed: Feb. 22, 2010

(51) Int. Cl.
*G06F 15/16* (2006.01)
(52) U.S. Cl.
USPC .......................................... 709/206; 709/207
(58) Field of Classification Search
USPC .................. 709/203, 206, 207, 223, 224, 225
See application file for complete search history.

(56) References Cited

U.S. PATENT DOCUMENTS

| 6,732,149 B1 * | 5/2004 | Kephart | 709/206 |
| 2005/0015455 A1 * | 1/2005 | Liu | 709/207 |
| 2005/0132197 A1 * | 6/2005 | Medlar | 713/176 |
| 2009/0157708 A1 * | 6/2009 | Bandini et al. | 707/100 |

OTHER PUBLICATIONS

Shaun Cooley; Systems and Methods for Identifying Spam Mailing Lists; U.S. Appl. No. 12/691,228, filed Jan. 21, 2010.

\* cited by examiner

*Primary Examiner* — Barbara Burgess
(74) *Attorney, Agent, or Firm* — ALG Intellectual Property, LLC (57) ABSTRACT

A computer-implemented method for distributing spam signatures may include identifying a set of spam e-mails. The computer-implemented method may also include identifying a plurality of clients, each client in the plurality of clients having received at least one e-mail in the set of spam e-mails. The computer-implemented method may further include identifying at least one mailing list by identifying at least one group of clients within the plurality of clients that have received a subset of the set of spam e-mails. The computer-implemented method may additionally include identifying at least one additional spam e-mail sent via the mailing list. The computer-implemented method may also include transmitting information identifying the additional spam e-mail to at least one client on the mailing list. Various other methods, systems, and computer-readable media are also disclosed.

19 Claims, 6 Drawing Sheets

SYSTEMS AND METHODS FOR DISTRIBUTING SPAM SIGNATURES

BACKGROUND

The number of unsolicited bulk e-mails (also known as "spam") transmitted via the Internet has grown consistently over the past decade, with some researchers now estimating that more than 80% of e-mail represents spam. Spam e-mails annoy consumers, consume precious network bandwidth and resources, and may be used as a vehicle for propagating malware or committing fraud.

To help consumers avoid spam, anti-spam vendors may maintain databases identifying spam. When a consumer attempts to download or access an e-mail, spam-filtering systems installed on a consumer's computing system may query these databases for information to determine whether to filter out an e-mail or warn the consumer about the e-mail.

Unfortunately, traditional spam-filtering systems may also have drawbacks. Each query may consume computing resources both on the consumer side and on the vendor side. Additionally, waiting for the result of a query before loading an e-mail may add unwanted latency to the consumer's experience. Accordingly, the instant disclosure identifies a need for efficiently distributing spam signatures.

SUMMARY

As will be described in greater detail below, the instant disclosure generally relates to systems and methods for distributing spam signatures. Embodiments of the instant disclosure may distribute spam signatures by identifying spam mailing lists (e.g., by analyzing recipient patterns of spam e-mails) and sending information on new spam e-mails (e.g., spam signatures) sent via the spam mailing lists to recipients on the spam mailing lists. For example, a method may include identifying a set of spam e-mails and identifying a plurality of clients that have received one or more of the spam e-mails. The method may also include identifying one or more mailing lists by identifying one or more clients in the plurality of clients that have received a subset of the set of spam e-mails. The method may further include identifying one or more additional spam e-mails sent via the mailing list and transmitting information identifying the additional spam e-mail to one or more clients on the mailing list.

In some embodiments, identifying the set of spam e-mails may include receiving a set of requests from the plurality of clients for information identifying spam e-mails in the set of spam e-mails. Identifying the additional spam e-mail sent via the mailing list may include identifying a subset of clients in the plurality of clients that belong to the mailing list and determining that the subset of clients are members of an identical set of mailing lists. Identifying the subset of clients may include a variety of approaches. For example, the method may include randomly selecting clients from the plurality of clients. In some examples, the subset of clients may include one or more honeypots. In some additional examples, the method may include selecting clients such that no two clients in the subset of clients are members of an identical set of mailing lists.

Transmitting the information identifying the additional spam e-mail to the client may entail determining when the client last requested information identifying spam and determining that the additional spam e-mail was associated with the mailing list after the client last requested information identifying spam. In some examples, transmitting the information identifying the additional spam e-mail may occur in the context of transmitting information identifying a set of additional spam e-mails to the client.

In various embodiments, the method may also include receiving a pre-fetch request from the client for information identifying spam (e.g., the pre-fetch request may precipitate the transmission of the information identifying the additional spam e-mail).

In some examples, a system for distributing spam signatures may include an identification module, an association module, a transmission module, and at least one processor. The identification module may be programmed to identify a set of spam e-mails and identify a plurality of clients that have received one or more of the spam e-mails. The association module may be programmed to identify one or more mailing lists by identifying one or more clients in the plurality of clients that have received a subset of the set of spam e-mails. The association module may further be programmed to identify one or more additional spam e-mails sent via the mailing list. The transmission module may be programmed to transmit information identifying the additional spam e-mail to one or more clients on the mailing list.

In some embodiments, the identification module may be programmed to identify the set of spam e-mails by receiving a set of requests from the plurality of clients for information identifying spam e-mails in the set of spam e-mails. The association module may be programmed to identify the additional spam e-mail sent via the mailing list by identifying a subset of clients in the plurality of clients that belong to the mailing list and determining that the subset of clients are members of an identical set of mailing lists. The association module maybe programmed to identify the subset of clients using a variety of approaches. For example, the association module may be programmed to randomly select clients from the plurality of clients. In some examples, the subset of clients may include one or more honeypots. In some additional examples, the association module may be programmed to select clients such that no two clients in the subset of clients are members of an identical set of mailing lists.

The transmission module may be programmed to transmit the information identifying the additional spam e-mail to the client by determining when the client last requested information identifying spam and determining that the additional spam e-mail was associated with the mailing list after the client last requested information identifying spam. In some examples, the transmission module may be programmed to transmit the information identifying the additional spam e-mail in the context of transmitting information identifying a set of additional spam e-mails to the client.

In various embodiments, the identification module may also be programmed to receive a pre-fetch request from the client for information identifying spam (e.g., the pre-fetch request may precipitate the transmission of the information identifying the additional spam e-mail).

In some embodiments, a computer-readable-storage medium may include one or more computer-executable instructions that, when executed by at least one processor of a computing device, may cause the computing device to 1) identify a set of spam e-mails, 2) identify a plurality of clients that have received one or more of the spam e-mails, 3) identify one or more mailing lists by identifying one or more clients in the plurality of clients that have received a subset of the set of spam e-mails, 4) identify one or more additional spam e-mails sent via the mailing list, and transmit information identifying the additional spam e-mail to one or more clients on the mailing list.

In some embodiments, the instructions may cause the computing device to identify the additional spam e-mail sent via the mailing list by identifying a subset of clients in the plurality of clients that belong to the mailing list and determining that the subset of clients are members of an identical set of mailing lists.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for distributing spam signatures. Systems and methods described herein may efficiently distribute spam signatures to clients by identifying spam mailing lists that target the clients and transmitting information about new spam e-mails sent via the spam mailing lists to the clients on the spam mailing lists. For example, the clients may send information identifying spam e-mails that they receive to a server. The server may analyze spam e-mail patterns present in the information received from the clients to identify probable spam mailing lists. When some of the clients receive a new spam e-mail, the server may determine that one of the identified spam mailing lists was responsible for the new spam e-mail. Later, when a client starts a session (e.g., an e-mail client opens and/or attempts to fetch new e-mails), it may pre-fetch information about new spam e-mails from the server. If the client is a member of the spam mailing list responsible for the new spam e-mail, the server may send information on that new spam e-mail to the client as well as any other new spam e-mails sent via mailing lists of which the client is a member. The client may then use this information to filter the new spam e-mail.

Figure 1:
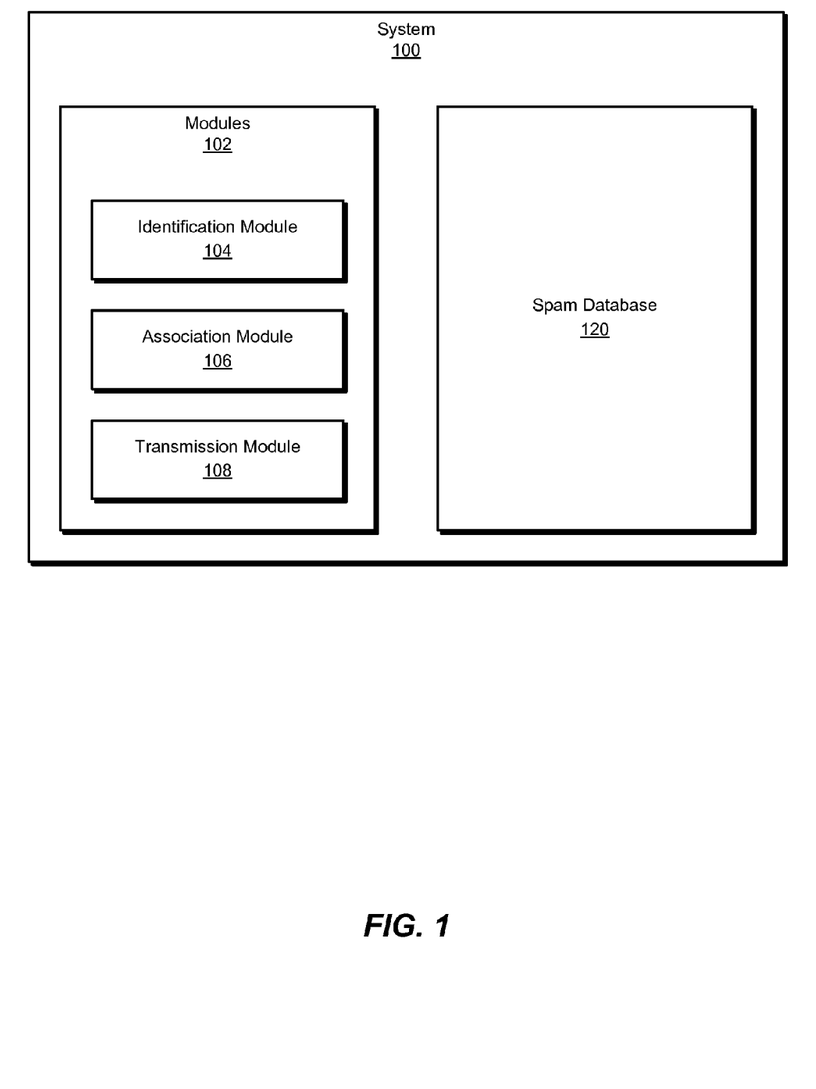
FIG. 1 is a block diagram of an exemplary system for distributing spam signatures.
Figure 2:
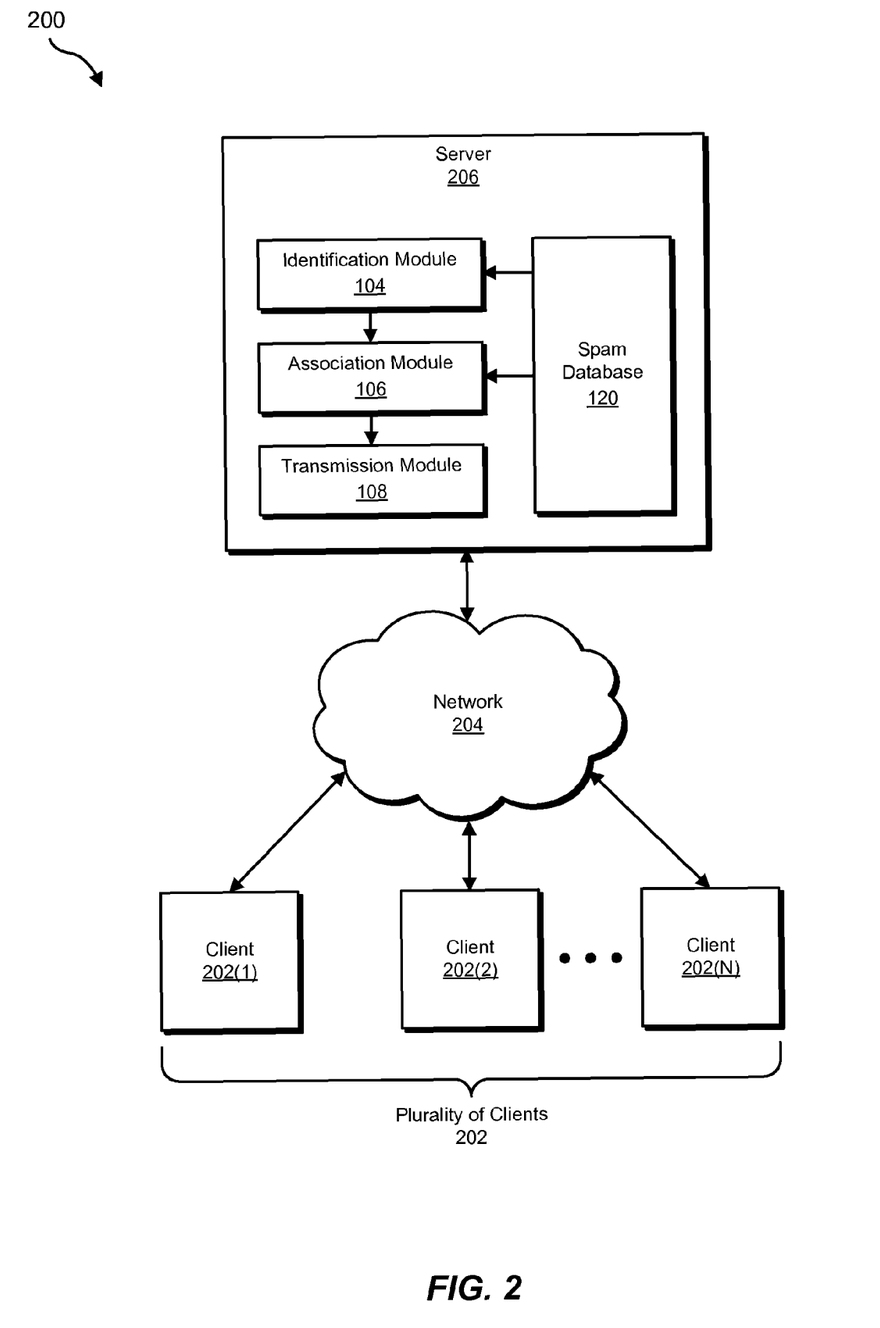
FIG. 2 is a block diagram of an exemplary system for distributing spam signatures.
Figure 3:
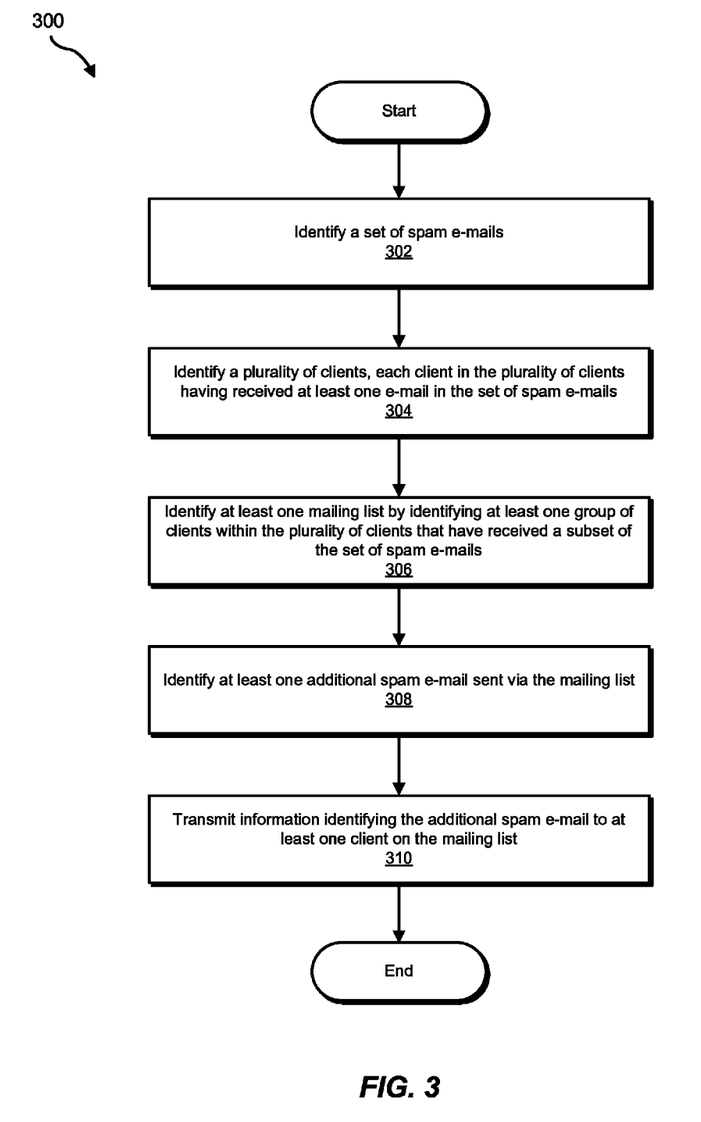
FIG. 3 is a flow diagram of an exemplary method for distributing spam signatures.
Figure 4:
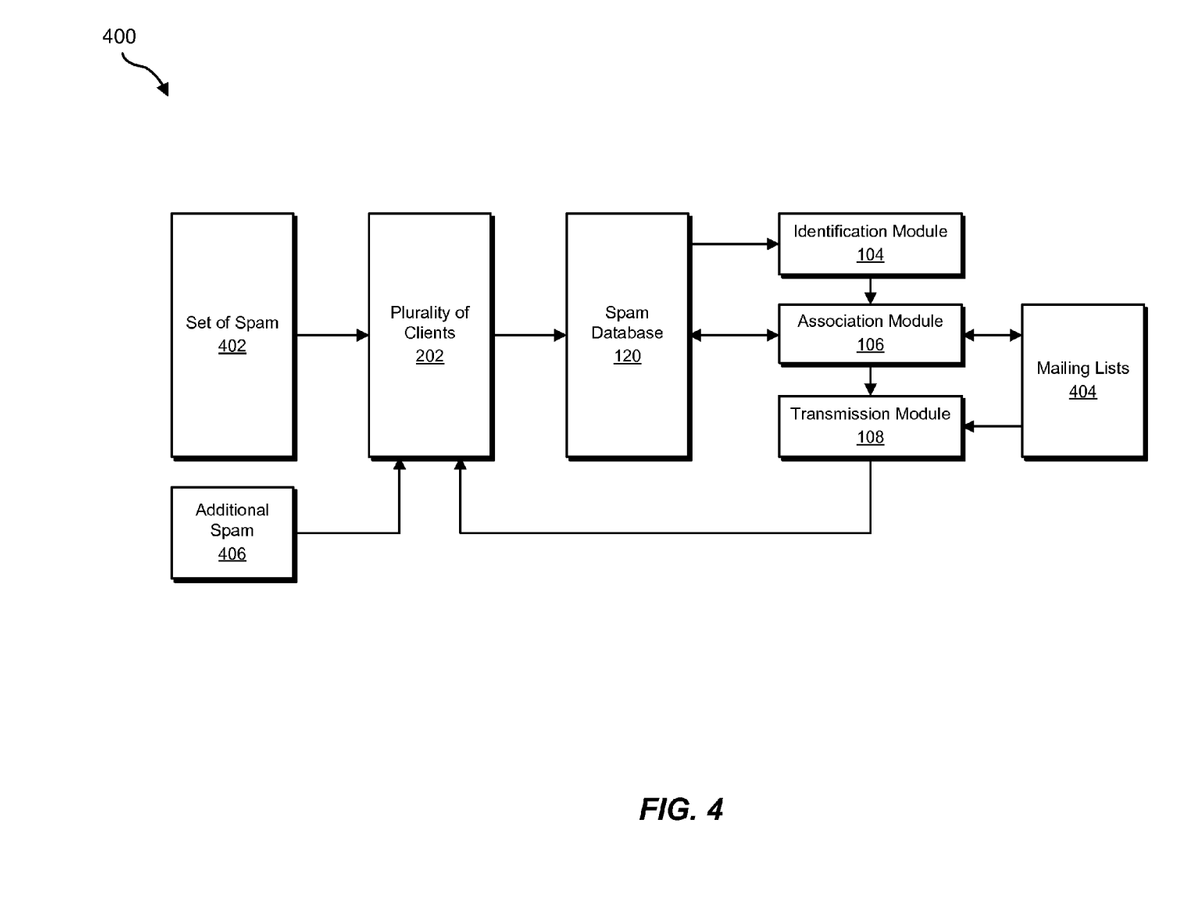
FIG. 4 is a block diagram of an exemplary system for distributing spam signatures.

The following will provide, with reference to FIGS. 1, 2, and 4, detailed descriptions of exemplary systems for distributing spam signatures. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for distributing spam signatures. As illustrated in this figure, exemplary system 100 may include one or more modules 102 for performing one or more tasks. For example, and as will be explained in greater detail below, exemplary system 100 may include an identification module 104 programmed to identify a set of spam e-mails and to identify a plurality of clients that have received one or more e-mails from the set of spam e-mails. Exemplary system 100 may also include an association module 106 programmed to identify at least one mailing list (e.g., by identifying a group of clients within the plurality of clients that have received a subset of the set of spam e-mails) and to identify at least one additional spam e-mail sent via the mailing list.

In addition, and as will be described in greater detail below, exemplary system 100 may include a transmission module 108 programmed to transmit information identifying the additional spam e-mail to at least one client on the mailing list. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., clients 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a spam database 120. Spam database 120 may represent portions of a single database or computing device or a plurality of databases or computing devices. In one embodiment, spam database 120 may store information on spam e-mails (e.g., information identifying the spam e-mails, when the spam e-mails were sent, recipients of the spam e-mails, mailing lists associated with the spam e-mails, etc.).

Spam database 120 in FIG. 1 may represent a portion of one or more computing devices. For example, spam database 120 may represent a portion of server 206 in FIG. 2, computing system 510 in FIG. 5, and/or portions of exemplary network architecture 600 in FIG. 6. Alternatively, spam database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of clients 202 in communication with a server 206 via a network 204. In one embodiment, and as will be described in greater detail below, server 206 may include one or more of modules 102 from FIG. 1. For example, server 206 may include identification module 104, association module 106, and transmission module 108.

Identification module 104 may identify a set of spam e-mails (e.g., from spam database 120). Identification module 104 may also identify a plurality of clients 202 (e.g., clients 202(1)-(N)) that have received one or more spam e-mails from the set of spam e-mails.

Association module 106 may identify at least one mailing list by identifying at least one group of clients within the plurality of clients that have received a subset of the set of spam e-mails (e.g., by querying spam database 120). Association module 106 may also identify at least one additional spam e-mail sent via the mailing lists. Transmission module 108 may then transmit information identifying the additional spam e-mail to one or more clients on the mailing list.

Clients 202(1)-(N) generally represent any type or form of computing devices capable of reading computer-executable instructions. Examples of clients 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of distributing spam signatures. Examples of server 206 include, without limitation, application servers and database servers configured to provide various database services and/or run certain software applications, anti-spam request servers, and/or security application servers.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between the plurality of clients 202 and server 206.

FIG. 3 is a flow diagram of an exemplary computer-implemented method 300 for distributing spam signatures. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a set of spam e-mails. For example, at step 302 identification module 104 may, as part of server 206, identify a set of spam e-mails referenced by spam database 120. As an additional example, FIG. 4 shows a set of spam 402 sent to the plurality of clients 202. The plurality of clients 202 may in turn send information about the set of spam 402 to spam database 120 (e.g., on server 206). Identification module 104 may then identify the set of spam e-mails from spam database 120.

Identification module 104 may perform step 302 in a variety of contexts. In one context, identification module 104 may receive a set of requests from the plurality of clients for information identifying spam e-mails in the set of spam e-mails. Using FIG. 4 as an example, when a client in the plurality of clients 202 receives a spam e-mail from the set of spam 402, the client may query spam database 120 (e.g., on server 206) to identify whether the spam e-mail is, in fact, spam. If spam database 120 did not already include information on the spam e-mail, spam database 120 may subsequently incorporate information identifying the spam e-mail. Additionally or alternatively, a heuristic spam filter on the client and/or on an anti-spam server (such as server 206) may generate information used to determine whether to include the spam e-mail in spam database 120. The query may include a signature corresponding to the e-mail message (e.g., a hash), a unique identifier corresponding to the client, the client's location, an identification of an agent used by the client to send the identifying information, a timestamp of the e-mail message, and/or any other suitable information.

Generally, identification module 104 may identify the set of spam e-mails using information transmitted in communications from a client to a backend anti-spam signature rating system (e.g., on an anti-spam server), such as SYMANTEC BRIGHTMAIL.

In some embodiments, identification module 104 may identify the set of spam e-mails by querying a spam database (such as spam database 120) and/or by simply identifying the spam database.

Returning to FIG. 3, at step 304 one or more of the systems described herein may identify a plurality of clients that have received at least one e-mail in the set of spam e-mails. For example, at step 304 identification module 104 may, as part of server 206, identify the plurality of clients 202. As an additional example, FIG. 4 shows a set of spam 402 sent to the plurality of clients 202. The plurality of clients 202 may in turn send information about the set of spam 402 to spam database 120 (e.g., on server 206). Identification module 104 may then identify each client in the plurality clients 202 as having received at least on e-mail in the set of spam 402.

Identification module 104 may identify a client by identifying any of a variety of components. For example, identification module 104 may identify an e-mail client, an e-mail client extension and/or plug-in, a computing system that includes an e-mail client, and/or an SMTP proxy.

As the term "received" is used herein, a client may have "received" an e-mail by downloading an entire e-mail. Additionally or alternatively, a client may have "received" an e-mail by downloading, receiving, and/or identifying an e-mail header, a signature of the e-mail, metadata of the e-mail and/or any other information that identifies the e-mail.

In some embodiments, identification module 104 may identify the plurality of clients by querying a spam database (such as spam database 120) and/or by simply identifying the spam database.

Returning to FIG. 3, at step 306 one or more of the systems described herein may identify at least one mailing list by identifying at least one group of clients within the plurality of clients that have received a subset of the set of spam e-mails. For example, at step 306 association module 106 may, as part of server 206, identify at least one mailing list by identifying at least one group of clients within the plurality of clients 202 that have received a subset of the set of spam e-mails. As an additional example, FIG. 4 shows a set of spam 402 sent to the plurality of clients 202. The plurality of clients 202 may in turn send information about the set of spam 402 to spam database 120 (e.g., on server 206). Association module 106 may identify at least one mailing list by identifying at least one group of clients within the plurality of clients 202 that have received a subset of the set of spam 402.

As used herein, the phrase "mailing list" may refer to any identified set of one or more clients that are known to be, are likely to be, and/or are suspected to be targets of a common set and/or class of communications from a common source. For example, a mailing list may include a set of e-mail addresses to which a spammer sends a certain set of spam e-mails.

Association module 106 may identify the mailing list in any suitable manner. For example, association module 106 may identify the mailing list by querying a spam database (such as spam database 120) and/or by simply identifying the spam database. In some examples, association module 106 may perform an analysis to find patterns in the spam database between spam e-mails and clients that have received the spam e-mails. Association module 106 may perform the analysis in a variety of ways. For example, association module 106 may identify a group of clients that received the same spam e-mails (e.g., a group of clients associated with the same group of signatures). Additionally, association module 106 may use other information, such as when the spam e-mails were received by the various clients in the plurality of clients, and identify a group of clients that received the same spam e-mails in the same time period. In some embodiments, association module 106 may identify the group of clients by determining that the group of clients received e-mail messages that were substantially similar and/or equivalent (e.g., a spam message that included random characters at the end of each instance of the message as part of a detection evasion strategy).

In some approaches, association module 106 may analyze the spam database to identify a group of clients associated with patterns of spam e-mails received by performing a statistical analysis on information stored in the spam database (e.g., which clients received which spam messages at what times in which geographical regions). Association module 106 may perform any appropriate statistical analysis. For example, association module 106 may perform a k-means clustering, a fuzzy c-means clustering, a QT clustering, and/or a spectral clustering.

In some embodiments, once association module 106 analyzes information in the spam database to identify the mailing list, association module 106 may store information relating to the mailing list in the spam database for future reference. In some examples, the mailing list and other mailing lists analyzed, identified, and/or stored by association module 106 may be subject to continual revision as new information is incorporated (e.g., as identification module 104 receives new reports of spam e-mails from the plurality of clients).

Returning to FIG. 3, at step 308 one or more of the systems described herein may identify at least one additional spam e-mail sent via the mailing list. For example, at step 308 association module 106 may, as part of server 206, identify at least one additional spam e-mail sent via the mailing list. As an additional example, FIG. 4 shows an additional spam 406 sent to at least one client in the plurality of clients 202. The plurality of clients 202 may in turn send information about the additional spam 406 to spam database 120 (e.g., on server 206). Association module 106 may identify the additional spam 406 by via spam database 120.

Association module 106 may perform step 308 in any of the contexts and according to any of the methods by which identification module 104 may identify the set of spam e-mails as described earlier. For example, association module 106 may identify the additional spam e-mail upon receiving a request from at least one client in the plurality of clients for information identifying the additional spam e-mail. Association module 106 may identify the additional spam e-mail using information transmitted in communications from a client to a backend anti-spam signature rating system (e.g., on an anti-spam server).

In some embodiments, association module 106 may identify the additional spam e-mail by querying a spam database (such as spam database 120) and/or by simply identifying the spam database.

According to some examples, the additional spam e-mail may have been received by clients in the plurality of clients after the set of spam e-mails were received. Using FIG. 4 as an example, the plurality of clients 202 may first receive the set of spam 402. The plurality of clients 202 may then submit signatures of the spam e-mails in the set of spam 402 to spam database 120, which may record information relating to the spam e-mails in the set of spam 402 and/or the plurality of clients 202. Identification module 104 may identify the set of spam 402 and the plurality of clients 202, and association module 106 may identify mailing lists 404 (e.g., by generating mailing lists 404 based on an analysis of information in spam database 120 and/or simply querying spam database 120 for mailing lists 404). One or more clients in the plurality of clients may then receive additional spam 406.

Association module 106 may determine that the additional spam e-mail was sent via the mailing list in a variety of ways. For example, association module 106 may query a spam database to determine that the additional spam e-mail was sent via the mailing list. Additionally or alternatively, association module 106 may identify a subset of clients in the plurality of clients that belong to the mailing list and determine that the subset of clients have received the additional spam e-mail.

Association module 106 may identify the subset of clients in a variety of ways. For example, association module 106 may identify each client in the plurality of clients that belongs to the mailing list. Additionally or alternatively, association module 106 may randomly select clients that belong to the mailing list from the plurality of clients. In some examples, association module 106 may select honeypots that belong to the mailing list. As used herein, the term "honeypot" may refer to any account, address, system, and/or potential spam target used to attract, identify, and/or classify spam. For example, a honeypot may include an e-mail address created only to receive spam e-mails. In some examples, association module 106 may attempt to select only honeypots for the subset of clients.

In some embodiments, association module 106 may identify the additional spam e-mail only after limiting the identification attempt to a certain timeframe. For example, association module 106 may identify the additional spam e-mail because the additional spam e-mail was sent after the last of the set of spam e-mails was sent. Additionally or alternatively, association module 106 may identify the additional spam e-mail because the additional spam e-mail was received after the client last requested information identifying spam e-mails.

Association module 106 may also ensure and/or attempt to ensure that no two clients in the subset of clients are members of an identical set of mailing lists. For example, if association module 106 randomly selects clients that belong to the mailing list, association module 106 may select enough clients such that none of the clients' known mailing lists entirely overlap with any other client's mailing lists.

Association module 106 may determine that the subset of clients have received the additional spam e-mail by determining that each client in the subset of clients has received the additional spam e-mail. Additionally or alternatively, association module 106 may determine that the subset of clients have received the additional spam e-mail by determining that a predetermined proportion of the subset of clients has received the additional spam e-mail.

In some examples, association module 106 may determine that a client belongs to multiple mailing lists. In these examples, association module 106 may identify a subset of clients for each of the multiple mailing lists and examine a union of the subsets of clients. Association module 106 may then identify the additional spam e-mail by determining that the spam e-mail was received by clients in the union.

Returning to FIG. 3, at step 310 one or more of the systems described herein may transmit information identifying the additional spam e-mail to at least one client on the mailing list. For example, at step 310 transmission module 108 may, as part of server 206, transmit information identifying the additional spam e-mail to at least one client in plurality of clients 202 that is on the mailing list. Using FIG. 4 as an additional example, transmission module 108 may transmit information identifying the additional spam 406 to at least one client on the mailing list.

Transmission module 108 may perform step 310 in a variety of ways. For example, transmission module 108 may transmit the information identifying the additional spam e-mail as part of transmitting information identifying a set of additional spam e-mails. As mentioned above, association module 106 may identify the additional spam e-mail by determining that a subset of clients has received the additional spam e-mail. Association module 106 may also identify the set of additional spam e-mails at that time by determining that the subset of clients has received the set of additional spam e-mails. Accordingly, transmission module 108 may more efficiently transmit the information regarding the additional spam e-mail together with information regarding other additional spam e-mails previously identified.

In some examples, systems described herein may receive a pre-fetch request from the client for information identifying spam. For example, the client may request information on any new and/or additional spam e-mails sent via mailing lists of which the client is a member. The systems and methods described herein may then distribute information identifying spam to the client.

In some embodiments, transmission module 108 may selectively transmit information identifying spam e-mails. For example, transmission module 108 may determine when the client last requested information identifying spam. Transmission module 108 may then determine that the additional spam e-mail was associated with the mailing list after the client last requested information identifying spam. For example, transmission module 108 may determine that the client would not have received information identifying the additional spam e-mail on a previous attempt to pre-fetch information identifying spam e-mails.

Various embodiments and examples of predictive responses to internet object queries are disclosed in U.S. Application No. 12/691,228, titled "Systems and Methods for Identifying Spam Mailing Lists" and filed 2 Feb. 2010, the disclosure of which is incorporated, in its entirety, by this reference. By identifying spam mailing lists, embodiments of the instant disclosure may be able to efficiently distribute spam signatures to clients that may receive corresponding spam e-mails and that may therefore require information on the corresponding spam e-mails. For example, association module 108 may incorporate techniques and/or systems described in the above-mentioned disclosure.

By analyzing new spam e-mail messages against mailing lists, embodiments of the instant disclosure may allow a client to make a single request at the start of an e-mail downloading session in order to pre-fetch a recipient-specific list of spam signatures. Furthermore, a client may skip making a query to an anti-spam server when checking an individual e-mail if the signature of the individual e-mail is in the pre-fetched recipient-specific list. This may increase efficiency by reducing the number of queries sent and received as well as the number of responses sent and received. Providing a recipient-specific list in response to a pre-fetch query may also reduce latency for a user by not requiring the user to wait for a response when attempting to load a known spam e-mail identified in a pre-fetched list.

Figure 5:
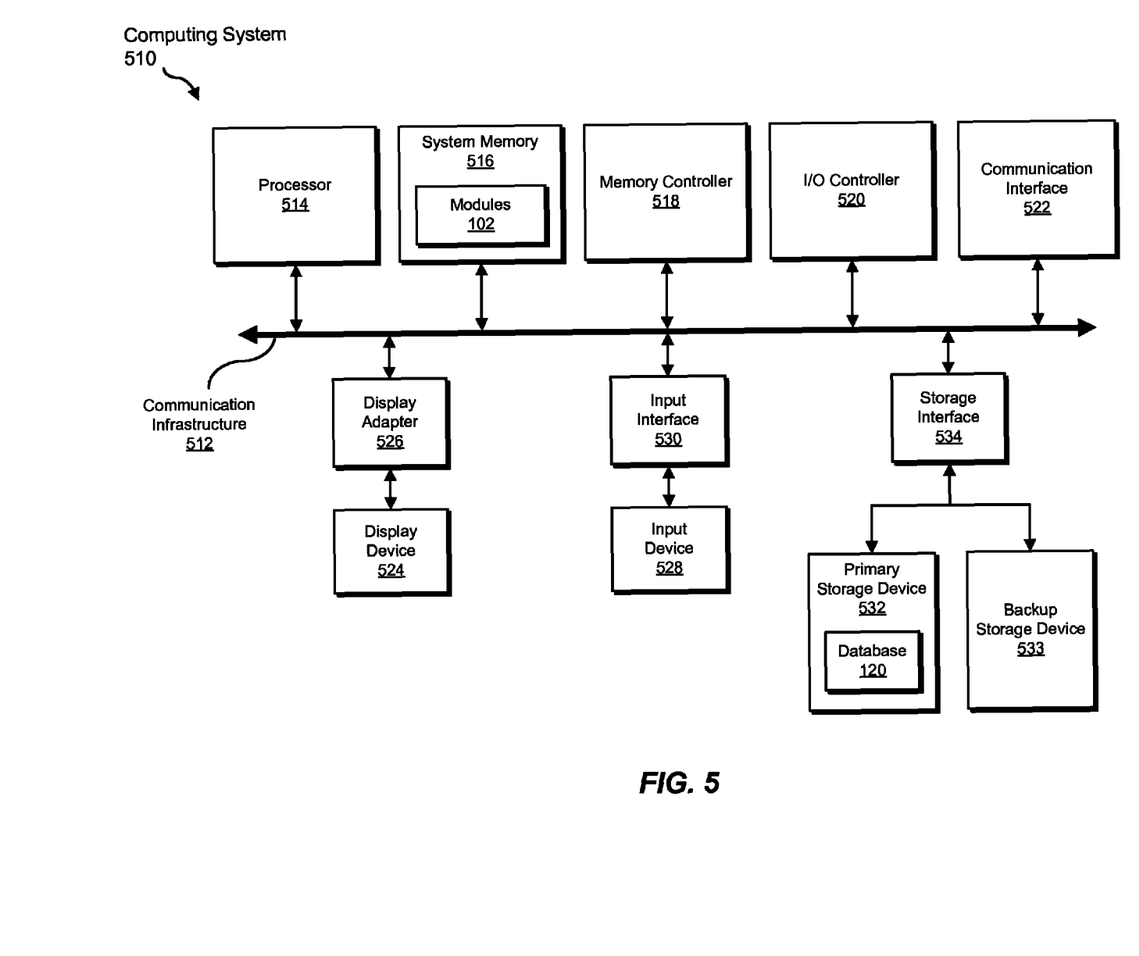
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, receiving, selecting, determining, and/or transmitting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, receiving, selecting, determining, and/or transmitting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, receiving, selecting, determining, and/or transmitting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, receiving, selecting, determining, and/or transmitting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, receiving, selecting, determining, and/or transmitting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, spam database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, receiving, selecting, determining, and/or transmitting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
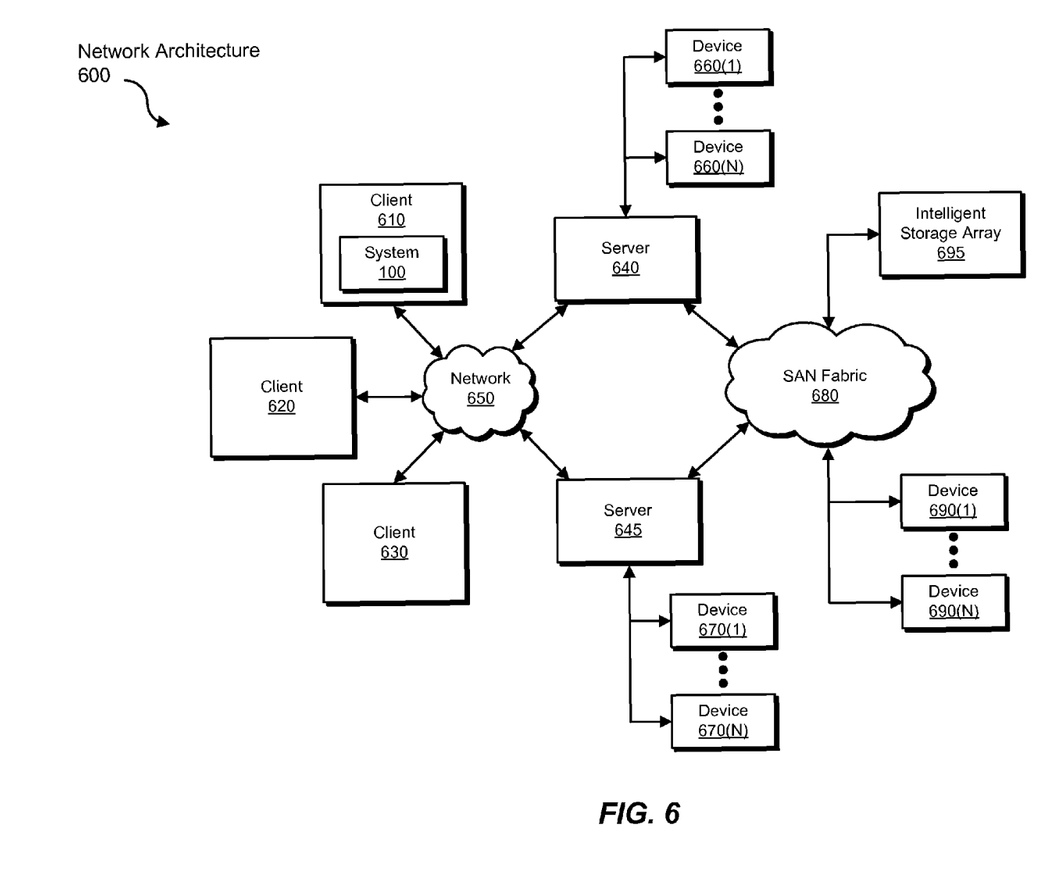
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, receiving, selecting, determining, and/or transmitting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for distributing spam signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an anti-spam request server into an efficient anti-spam request server that distributes spam signatures in response to pre-fetch requests.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for distributing spam signatures, at least a portion of the method being performed by a computing device comprising at least one processor, the method comprising:
   identifying a set of spam emails;
   identifying a plurality of clients, each client in the plurality of clients having received at least one email in the set of spam emails;
   identifying at least one probable mailing list by analyzing email patterns in information received from the plurality of clients to identify at least one group of clients within the plurality of clients that have received a subset of the set of spam emails;
   receiving, from a client on the at least one probable mailing list, a request to pre-fetch spam signatures;
   in response to the request to pre-fetch spam signatures, creating a set of recipient-specific spam signatures specific to the client by identifying a set of spam emails sent to one or more additional clients on the at least one probable mailing list, wherein creating the set of recipient-specific spam signatures comprises:
      identifying a subset of clients in the plurality of clients that belong to the at least one probable mailing list;
      determining that the subset of clients have received an additional spam email;
      including the additional spam email in the set of spam emails such that a signature of the additional spam email is included in the set of recipient-specific spam signatures;
   transmitting the set of recipient-specific spam signatures to the client such that the client is enabled to filter spam messages sent to the one or more additional clients and skip making individual queries for emails identified within the set of recipient-specific spam signatures, wherein:
   at least one of the identifying, receiving, creating, and transmitting steps are performed by the computing device comprising the at least one processor.

2. The computer-implemented method of claim 1, wherein identifying the subset of clients comprises randomly selecting clients from the plurality of clients.

3. The computer-implemented method of claim 1, wherein the subset of clients comprises at least one honeypot client, the honeypot client comprising an email address created for the sole purpose of receiving spam emails.

4. The computer-implemented method of claim 1, wherein each client in the subset of clients, other than the client prefetching spam signatures, comprises a honeypot client created for the sole purpose of receiving spam emails.

5. The computer-implemented method of claim 1, wherein creating a set of recipient-specific spam signatures specific to the client by identifying a set of spam emails sent to one or more additional clients on the at least one probable mailing list comprises:
   determining when the client last requested information identifying spam;
   determining that the set of spam emails were associated with the at least one probable mailing list after the client last requested information identifying spam.

6. The computer-implemented method of claim 1, wherein receiving the request to pre-fetch spam signatures comprising transmitting information identifying another spam email received at the client.

7. The computer-implemented method of claim 1, wherein the client sends the request to pre-fetch spam signatures in response to an email program on the client opening.

8. The computer-implemented method of claim 1, wherein the client sends the request to pre-fetch spam signatures in response to an email program on the client attempting to fetch new emails.

9. A system for distributing spam signatures, the system comprising:
   an identification module programmed to:
      identify a set of spam emails;
      identify a plurality of clients, each client in the plurality of clients having received at least one email in the set of spam emails;
   an association module programmed to:
      identify at least one probable mailing list by analyzing email patterns in information received from the plurality of clients to identify at least one group of clients within the plurality of clients that have received a subset of the set of spam emails;
      receive, from a client on the at least one probable mailing list, a request to pre-fetch spam signatures;
      in response to the request to pre-fetch spam signatures, create a set of recipient-specific spam signatures specific to the client by identifying a set of spam emails sent to one or more additional clients on the at least one probable mailing list, wherein the association module is programmed to create the set of recipient-specific spam signatures by:

identifying a subset of clients in the plurality of clients that belong to the at least one probable mailing list;

determining that the subset of clients have received an additional spam email;

including the additional spam email in the set of spam emails such that a signature of the additional spam email is included in the set of recipient-specific spam signatures;

a transmission module programmed to transmit the set of recipient-specific spam signatures to the client such that the client is enabled to filter spam messages sent to the one or more additional clients and skip making individual queries for emails identified within the set of recipient-specific spam signatures;

at least one processor configured to execute the identification module, the association module, and the transmission module.

10. The system of claim 9, wherein the request to pre-fetch spam signatures comprises a request for information about new or additional spam emails sent via one or more mailing lists of which the client is a member.

11. The system of claim 9, wherein:

the association module is programmed to determine the client belongs to a plurality of mailing lists;

determining that the client belongs to a plurality of mailing lists comprises identifying the at least one probable mailing list.

12. The system of claim 11, wherein the association module is programmed to create the set of recipient-specific spam signatures specific to the client by:

identifying a subset of clients for each of the plurality of mailing lists;

examining a union of the subset of clients;

identifying the set of spam emails by identifying spam emails received by clients in the union.

13. The system of claim 9, wherein the association module is programmed to identify the set of spam emails sent to one or more additional clients on the at least one probable mailing list by, for each additional email in the set of spam emails, determining that a predetermined proportion of the one or more additional clients on the at least one probable mailing list received the additional email.

14. The system of claim 9, wherein the transmission module is programmed to transmit the set of recipient-specific spam signatures to the client by:

determining when the client last requested information identifying spam;

determining that the set of spam emails was associated with the at least one probable mailing list after the client last requested information identifying spam.

15. The system of claim 9, wherein the association module is programmed to identify at least one group of clients within the plurality of clients that have received a subset of the set of spam emails by randomly selecting a subset of clients that belong to the at least one probable mailing list.

16. The system of claim 9, wherein the at least one probable mailing list comprises a plurality of clients that are likely to be targets of a common set or class of communications from a common source.

17. The system of claim 9, wherein the association module is programmed to analyze email patterns in information received from the plurality of clients by identifying one or more groups of clients that received substantially similar or equivalent emails messages within a certain time period.

18. A non-transitory computer-readable-storage medium comprising one or more computer-executable instructions that, when executed by at least one processor of a computing device, cause the computing device to:

identify a set of spam emails;

identify a plurality of clients, each client in the plurality of clients having received at least one email in the set of spam emails;

identify at least one probable mailing list by analyzing email patterns in information received from the plurality of clients to identify at least one group of clients within the plurality of clients that have received a subset of the set of spam emails;

receive, from a client on the at least one probable mailing list, a request to pre-fetch spam signatures;

in response to the request to pre-fetch spam signatures, create a set of recipient-specific spam signatures specific to the client by identifying a set of spam emails sent to one or more additional clients on the at least one probable mailing list, wherein creating the set of recipient-specific spam signatures comprises:

identifying a subset of clients in the plurality of clients that belong to the at least one probable mailing list;

determining that the subset of clients have received an additional spam email;

including the additional spam email in the set of spam emails such that a signature of the additional spam email is included in the set of recipient-specific spam signatures;

transmit the set of recipient-specific spam signatures to the client such that the client is enabled to filter spam messages sent to the one or more additional clients and skip making individual queries for emails identified within the set of recipient-specific spam signatures.

19. The non-transitory computer-readable-storage medium of claim 18, wherein the one or more computer-executable instructions that are further programmed to cause the computing device to revise the at least one probable mailing list as new reports of spam emails are received from the plurality of clients.

* * * * *